No. 896,545. PATENTED AUG. 18, 1908.
R. B. HUMAN.
STALK CUTTER ATTACHMENT FOR PLOWS.
APPLICATION FILED APR. 7, 1908.
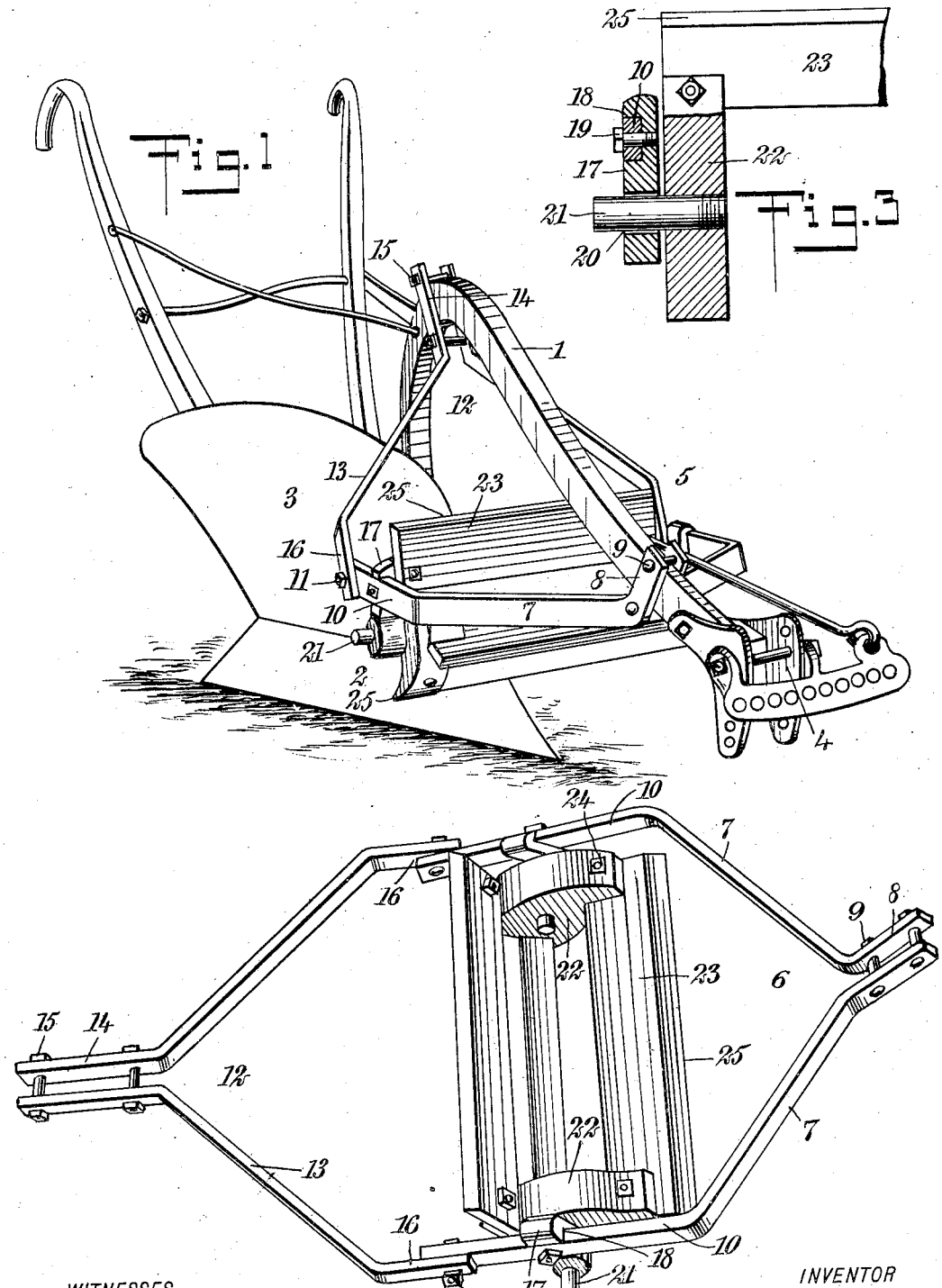
WITNESSES
INVENTOR
Robert B. Human
BY
ATTORNEYS.

UNITED STATES PATENT OFFICE.

ROBERT B. HUMAN, OF CHICKASHA, OKLAHOMA.

STALK-CUTTER ATTACHMENT FOR PLOWS.

No. 896,545.	Specification of Letters Patent.	Patented Aug. 18, 1908.

Application filed April 7, 1908. Serial No. 425,679.

*To all whom it may concern:*

Be it known that I, ROBERT B. HUMAN, a citizen of the United States, and a resident of Chickasha, in the county of Grady and State of Oklahoma, have invented a new and Improved Stalk-Cutter Attachment for Plows, of which the following is a full, clear, and exact description.

This invention relates to a stalk cutter attachment for plows, and the object of the invention is to produce a device of this kind which is simple in construction and which can be conveniently attached to plows of ordinary construction.

A further object of the invention is to provide a construction which will enable the level of the device to be adjusted with respect to the plowshare.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a perspective of a plow to which my invention has been attached; Fig. 2 is a perspective of the stalk cutter removed from the plow; and Fig. 3 is a vertical section upon an enlarged scale taken through one end of the stalk cutter and illustrating the manner in which the revolving blades are hung.

Referring more particularly to the parts, 1 represents the beam of the plow having a plowshare 2 and a mold board 3. At the forward end of the beam 1 a clevis or draft device 4 of any suitable construction is provided. The stalk cutter 5 which constitutes my invention, is hung upon the beam 1; it is supported at the forward end of the beam by means of a forward fork 6, said fork being formed of two arms 7. The bodies of these arms diverge from each other in a rearward direction, and the forward ends are formed into parallel clamping heads 8 which are connected by clamping bolts 9. One of the bolts 9 is disposed above the beam 1, and the other below the beam, so that when the bolts are tightened the heads 8 operate as clamping jaws to secure the fork to the beam rigidly.

The outer or rear portions of the arms 7 are formed into bars 10 which are disposed parallel with each other, as shown.

As indicated in Fig. 1, the heads or jaws 8 project upwardly or laterally in an inclined direction from the arms 7 so as to accommodate themselves to the direction of the beam at this point. The rear ends of the bars 10 are pivotally attached by pivot bolts 11 to the forward ends of a rear fork 12. This rear fork is very similar in construction to the forward fork 6; it is formed with diverging bars 13 having parallel extensions or clamping jaws 14 provided with clamping bolts 15, as indicated. Between these bolts 15 the beam 1 is received, and when the bolts are tightened, the fork will become rigidly attached to the beam, as will be readily understood. The forward or lower portions of the fork 12 are formed with parallel extensions 16 which overlap the parallel bars 10 so as to receive the pivot bolts 11, as indicated.

Just forward of the pivot bolts 11, I provide boxes or hangers 17, which are formed with notches 18 receiving the side bars 10, as indicated. At these notches screw bolts 19 are provided, which rigidly secure the hangers to the side bars. These hangers project downwardly, and are provided with openings 20 which receive loose gudgeons 21. These gudgeons are rigidly attached to hubs 22, from the outer faces of which they project as indicated. These hubs 22 are provided with a plurality of knives or cutters 23, which are attached to them by bolts 24 as indicated. These knives or blades extend transversely with respect to the beam and are rotatable as a whole on the axes of the trunnions or gudgeons 21. The outer edges 25 of the blades are sharpened. The blades 23, in combination with the hubs, constitute a cutter reel.

It should be understood that in attaching the device to the plow, it is carefully adjusted so as to bring the axis of the cutter reel to the proper level, so that when the plow is drawn along, the reel will be rotated by rolling upon the ground. In this way the cutting edges 25 present themselves to the stalks of weeds and similar growth and cut them off.

Special attention is called to the simple construction of the frame of the cutter, which frame is formed of two pivotally attached forks 6 and 12. Attention is also called to the fact that the device may be readily attached to a plow of any construction having a beam such as that shown, and the required adjustments may be readily made.

Having thus described my invention, I claim as new and desire to secure by Letters Patent:

1. A cutter attachment for a plow, comprising a frame having a fork, means for clamping the same to the beam of the plow forwardly thereof, a second fork pivotally attached to said first fork and having means for clamping the same to the beam near the rear portion thereof, and a rotatable reel carrying knives, supported by said forks.

2. A stalk cutter device, having a fork formed of oppositely disposed bars with clamping jaws adapted to engage the beam of a plow, clamping bolts for clamping said jaws upon the plow beam, a second fork having jaws adapted to clamp the beam near the rear portion thereof and carrying clamping bolts, means for pivotally connecting said forks, hangers attached to said forward fork, and a rotatable reel mounted in said hangers and carrying knives extending transversely.

In testimony whereof I have signed my name to this specification in the presence of two subscribing witnesses.

ROBERT B. HUMAN.

Witnesses:
 JOHN H. HARTMANN,
 F. R. HARRISON.